(12) United States Patent
Rathgeber et al.

(10) Patent No.: US 7,131,528 B1
(45) Date of Patent: Nov. 7, 2006

(54) CHAIN GUIDE FOR A CONTINUOUS RUNNING TRANSPORT CHAIN

(75) Inventors: Peter Rathgeber, Dornstetten (DE); Achim Gauß, Dornstetten/Hallwangen (DE)

(73) Assignee: Homag Holzbearbeitungssysteme AG (DE)

( * ) Notice: Subject to any disclaimer, the term of this patent is extended or adjusted under 35 U.S.C. 154(b) by 0 days.

(21) Appl. No.: 11/215,800

(22) Filed: Aug. 30, 2005

(51) Int. Cl.
*B65G 15/60* (2006.01)

(52) U.S. Cl. ................... 198/805; 198/690.1
(58) Field of Classification Search ......... 198/690.1, 198/805, 838, 619
See application file for complete search history.

(56) References Cited

U.S. PATENT DOCUMENTS

| | | | | |
|---|---|---|---|---|
| 5,027,942 A | * | 7/1991 | Wallaart | ............ 198/805 |
| 5,036,969 A | * | 8/1991 | Garbagnati | ............ 198/805 |
| 5,165,527 A | * | 11/1992 | Garbagnati | ............ 198/805 |
| 5,975,277 A | * | 11/1999 | Skarlupka | ............ 198/805 |

* cited by examiner

*Primary Examiner*—James R. Bidwell
(74) *Attorney, Agent, or Firm*—Bourque & Associates, P.A.

(57) ABSTRACT

A chain guide for a continuous running transport chain includes chain links with track rollers and guide rollers that correspond to a guide rail with two tracks for the track rollers at a distance from one another and in between a groove profile for the engagement of the guide rollers. The guide rollers are supported by axle bolts that protrude at the chain links and through which the guide rollers protrude. To achieve good vibration damping of the transport chain, magnets are placed at the bottom of the groove profile of the guide rail with the magnetic circuit closing across the free ends of the axle bolts at the chain links across an air gap.

9 Claims, 1 Drawing Sheet

CHAIN GUIDE FOR A CONTINUOUS RUNNING TRANSPORT CHAIN

TECHNICAL FIELD

The invention relates to a chain guide for a continuous running workpiece transport chain.

BACKGROUND INFORMATION

Such transport chains are primarily used in wood processing machines, whereby the workpieces that are to be carried by the transport chains are furniture components, boards for interior construction, or other boards made of wood or wood-like materials used in the construction industry. The continuous processing machines intended for such purposes are designed with ever increasing conveyor speeds, resulting in increased wear problems. The chain links, provided with track rollers and guide rollers, are subject to uncontrollable snaking movements, which considerably affect the proper rolling movement of the track rollers and guide rollers in the guide profiles and typically extend not only along the upper run of the conveyor chain but also along the return area at the sprocket wheels.

The troublesome vibrations are attributed primarily to the fact that as the transport chain runs around the sprocket wheels, it assumes the shape of a polygon into which and from which the individual chain links must be deflected due to the otherwise linear position. Pulsating tensile forces are acting especially on the drive sprocket wheel because of the polygon effect. The vibrations induced in this manner in the transport chain prevent the track rollers and guide rollers of the chain links from being in uniform contact with the tracks of the guide profile of the guide rails and instead lift off sporadically and then strike down on it again. The accelerating and decelerating forces associated with this action as well as the abrupt forces impacting the rollers, the guide profiles and the sprocket wheels lead to great wear of these components and their assemblies within a short period, leading to a breakdown of the transport system. The troublesome vibrations are additionally promoted by a loose, hanging return of the lower run of the transport chain.

Already recommended was a magnetic chain steering system for high-speed transport chains, where permanent magnets are integrated in the guide rail immediately adjacent to the tracks for the track rollers of the chain links. The magnetic circuit of the permanent magnets closes across the tracks and the rolling track rollers of the chain link, whereby an air gap is provided between the outer face of the track rollers and a web at the guide rail, which is located to the side of the track in a protruding manner. Since the track rollers touch the track of the guide rail in an essentially linear manner, and the magnetic forces in the air gap act axially parallel upon the track rollers of the chain link, no optimal conditions for damping the vibrations of the transport chain are created with this type of magnetic chain steering.

It is, therefore, the objective of the invention to create a chain guide system of the kind mentioned above, where good vibration damping of the transport chain is achieved using magnetic forces.

SUMMARY

This objective is achieved with the chain guide system of the kind mentioned above through the characteristic features of the invention claimed herein.

It is essential for the invention that the magnetic forces acting in the air gap, act essentially in the orthogonal direction to the track of the guide rail for the track rollers at the chain links. This more effectively avoids that the chain links lift off the tracks of the guide rail, thus avoiding the chatter of the track rollers of the chain links on the tracks, thus avoiding the associated wear symptoms.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
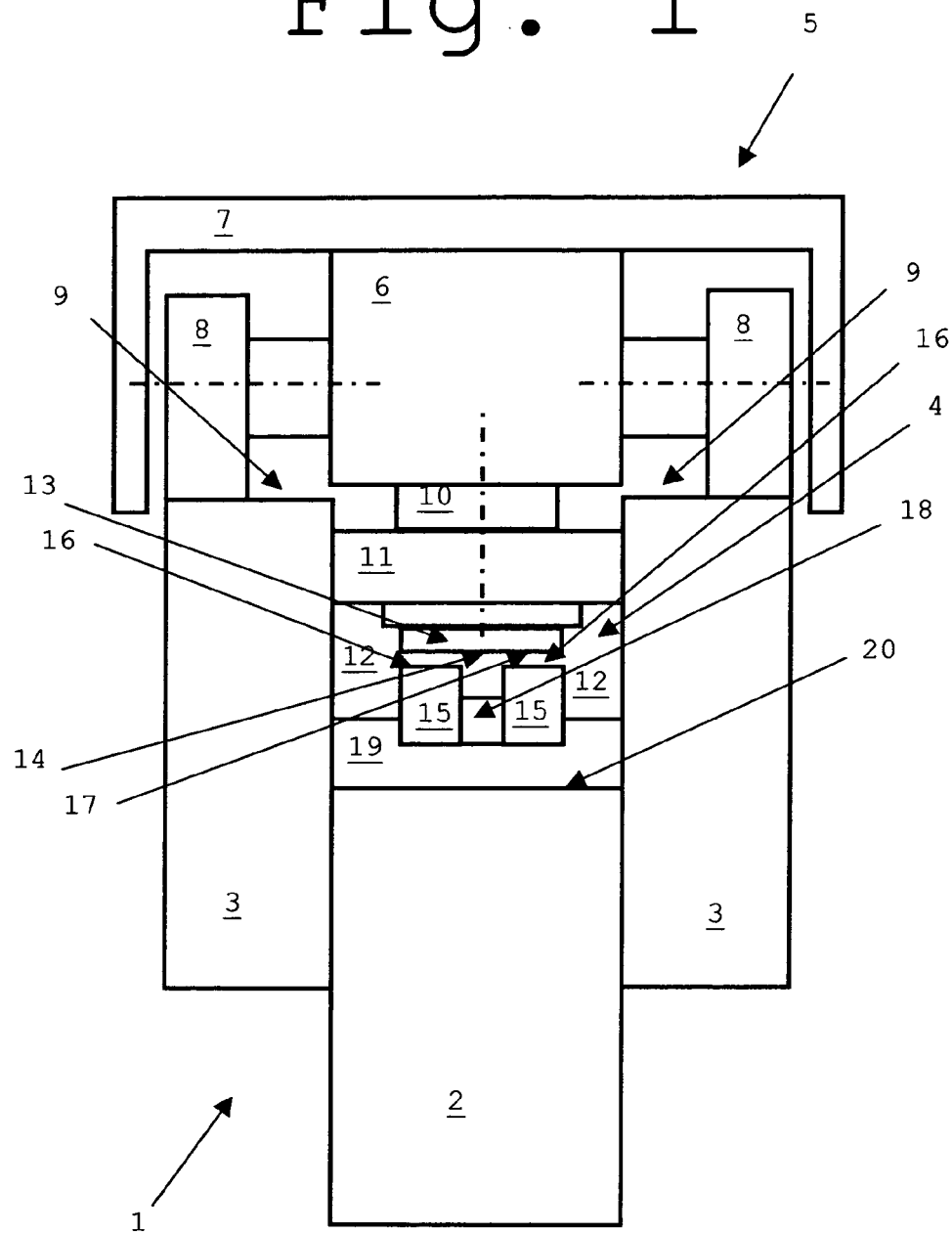
FIG. 1 is a face view a guide rail for a workpiece transport chain including a chain link of the transport chain.

In detail, the drawing shows a guide rail 1 that exhibits a center carrier 2. Located on the sides of the carrier 2 are carrier rails 3, which protrude beyond the upper side 20 of the carrier 2 located in the presentation in the upper direction. A groove profile 4, exhibiting a rectangular or square cross-section, is formed between the carrier rails 3. Overall, the guide rail 1 is designed mirror-symmetrically with regard to a vertical center plane that goes through the carrier 2.

The guide rail 1 is used to guide a transport chain that is not shown completely in the drawing; instead, only one single chain link 5 can be recognized. The chain link 5 exhibits a chain link body 6 on which a workpiece carrier plate 7 is placed. Located on the sides of the chain link body 6 are track rollers 8 that roll in tracks 9, which are formed by the same-level upper sides of the carrier rails 3 of the guide rail 1. The track rollers 8 have horizontal axes and, as a rule, are designed as cylindrical bodies, such that the tracks 9 extend in a horizontal plane at least along the transport path of the workpiece. The transport chain is turned around using two sprocket wheels and rotates accordingly along an oval path with the linearly extending upper run and lower run. Guide rails are placed along the rotation path similar to the shown guide rail 1. In the turn around area of the transport chain 5, the guide rails run semi-circular along the sprocket wheels. The arrangement of the guide rail at the lower run of the transport chain is head standing compared to that of the guide rail 1 shown in the drawing.

In the vertical direction, an axle bolt 10 protrudes at the chain link body 6 of each chain link 5 with a guide roller 11 being supported by said axle bolt. The guide roller 11 assumes the task of the side guide of the transport chain and rolls on one of the inner sides 12 of the carrier rail 3 of the guide rail 1. The diameter of the guide roller 11 is minimally smaller than the distance of the two opposite inner sides 12 of the carrier rail 3. Thus, in order to prevent friction losses, a minimal air gap exists toward that inner side 12 of the carrier rail 3, where the guide roller 11 currently does not roll. Due to the described design, the axle bolt 10 and the guide roller 11 of the chain links 5 dip into the groove profile 4 of the guide rail 1. The axle bolt 10 protrudes through the guide roller 11 and, therefore, exhibits a free end 13 that is designed with a flat face area 14 and protrudes beyond the guide roller 11.

Magnets 15 that may be permanent magnets or electrically excited magnets are placed at the bottom of the groove profile 4. The magnets 15 are embedded in a mounting device 19 that is placed on the upper side 20 of the carrier rail 2 of the guide rail 1 and that follows on the sides the inner side 12 of the carrier rails 3 of the guide rail 1. The mounting device 19 can assume the function of a magnetic yoke for the magnets 15; a spacer element 18, which either is built as an isolation element or may also function as a magnetic yoke for the magnets 15, is located between the magnets 15.

On their upper sides, the magnets 15 exhibit flat pole areas 16 and opposite to them across an air gap 17 are the face areas 14 of the axle bolts 10 at the chain links 5, which move relative to said flat pole areas. At least in the area of the straight running guide rails 1, this air gap 17 is oriented horizontally, because in these areas the face areas 14 at the axle bolts 10 of the chain links 5 and the pole areas 16 of the magnets 15 are oriented horizontally and are, therefore, parallel to one another.

Different from what is shown, the air gap 17, and correspondingly the face areas 14 of the axle bolts 10 of the chain links 5 and the parallel pole areas 16 of the magnets 15 can be provided with a slope that deviates from the horizontal direction, in order to have the magnetic forces act upon the chain links 5 such that their guide rollers 11 roll exclusively at the carrier rail 3, in which case it is even possible to omit the carrier rail that lies opposite this carrier rail 3.

As mentioned above, the present invention is not intended to be limited to a system or method which must satisfy one or more of any stated or implied object or feature of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A chain guide for a continuous running transport chain on a machine for continuous processing of workpieces, the transport chain having track rollers (8) and guide rollers (11) located at chain links (5) and with at least one guide rail (1) located at the machine frame along at least one section of the rotation path of the transport chain, where said guide rail exhibits two tracks (9) for the track rollers (8) of the chain links (5) with said tracks being at a distance from one another and in between a groove profile (4) into which reach the guide rollers (11) of the chain links (5), which are supported by axle bolts (10) that protrude through the guide rollers (11), characterized in that magnets (15) are located at the bottom of the groove profile (4) of the guide rail (1) with a magnetic circuit closing across the free ends (13) of the axle bolts (10) at the chain links (5) across an air gap (17).

2. A chain guide as set forth in claim 1, characterized in that the axle bolts (10) at the chain links (5) exhibit flat face areas (14) at their free ends (13) with respective flat pole areas (16) of the magnets (15) located opposite to them across the air gap (17).

3. A chain guide as set forth in claim 2, characterized in that at a linearly extending guide rail (1), the face areas (14) of the axle bolts (10) of the chain links (5) and the pole areas (16) of the magnets (15) are parallel to one another.

4. A chain guide as set forth in claim 3, characterized in that along horizontal sections of the rotation path of the transport chain, the face areas (14) of the axle bolts (10) of the chain links (5) and the pole areas (16) of the magnets (15) are oriented horizontally.

5. A chain guide as set forth in claim 3, characterized in that the face areas (14) of the axle bolts (10) of the chain links (5) and the pole areas (16) of the magnets (15) are in a substantially horizontal direction, or out of the respective rotational direction, in the direction perpendicular to the running direction of the chain links (5).

6. A chain guide as set forth in claim 1, characterized in that the magnets (15) are permanent magnets.

7. A chain guide as set forth in claim 1, characterized in that the guide rail (1) consists of a center carrier (2) and carrier rails (3) that protrude on the sides beyond the carrier (2) and that enclose the groove profile (4) between them, whereby the magnets (15) are located on an upper side (20) of the carrier (2) that defines the groove profile (4).

8. A chain guide as set forth in claim 7, characterized in that placed on the upper side (20) of the carrier (2) of the guide rail (1) is a mounting device (19) for the magnets (15).

9. A chain guide as set forth in claim 8, characterized in that the mounting device (19) for the magnets (15) is enclosed positively in the groove profile (4) between the carrier rails (3) of the guide rail (1).

* * * * *